United States Patent [19]
Hardcastle

[11] 4,095,612
[45] Jun. 20, 1978

[54] GATE VALVE

[75] Inventor: Philip P. Hardcastle, Houston, Tex.

[73] Assignee: Equipment Renewal Company, Houston, Tex.

[21] Appl. No.: 768,277

[22] Filed: Feb. 14, 1977

[51] Int. Cl.² ............................................. F16K 19/00
[52] U.S. Cl. ............................... 137/246.22; 251/176; 251/196
[58] Field of Search ............... 137/246.22; 251/327, 251/195, 193, 196, 176

[56] References Cited

U.S. PATENT DOCUMENTS

| | | | |
|---|---|---|---|
| 2,653,789 | 9/1953 | Eichenberg | 251/196 X |
| 2,758,813 | 8/1956 | Anderson | 251/196 X |
| 3,057,378 | 10/1962 | Fennema | 251/176 X |
| 3,078,865 | 2/1963 | Estes | 137/246.22 |
| 3,223,380 | 12/1965 | Hochmuth | 251/327 X |
| 3,269,699 | 8/1966 | Tomlin | 251/327 |
| 3,349,789 | 10/1967 | Crain | 137/246.22 |

*Primary Examiner*—Harold W. Weakley
*Attorney, Agent, or Firm*—Jack W. Hayden

[57] ABSTRACT

A gate valve includes a body with a flow passage therethrough and spaced annular seating members in the body surrounding the flow passage with seal means between the seating members and the body. A gate member is positioned between the seat members and has a surface to intersect and close off the flow passage through the body and has an opening for alignment with the flow passage through the body for flow therethrough. The annular seating members include an annular surface for abutting the gate with an annular teflon seal means in the surface and an annular groove also therein with sealant passage means for communicating with sealant passage means in the body for directing sealant to the groove means. Spaced projecting vertical guide surfaces are provided on the annular seating members for abutting the edges of the gate member to retain it aligned in the body. A stem is threadedly secured with a cylindrical member rotatably carried by the gate member whereby rotation of the stem raises and lowers the gate. The gate member includes a pair of rectangular plate members with means connecting the plate members together while accommodating limited relative movement therebetween with spring means tending to urge said plate members apart.

1 Claim, 4 Drawing Figures

GATE VALVE

SUMMARY OF THE INVENTION

Gate valves have been well known and used for a number of years employing a variety of constructions. Such valves normally include a valve body with a flow passage therethrough, spaced annular seating members in the body and plate members forming a gate with a surface for blocking flow through the body and with an opening for aligning with a flow passage in the body. Also such constructions have included a sealant arrangement for supplying sealant to the face of the gate member to attain sealing between the gate member and the annular seating members.

Normally when the gate is removed from the body of prior art constructions, it tends to fly apart due to the fact that the plate member comprises two plates which are urged apart by spring members positioned therebetween. This is disadvantageous in that the springs and other parts may thus become misplaced or time is required to recover them after they have become separated from the gate member. The present invention is directed to a gate valve including a gate member formed of a pair of plates which are secured together to accommodate relative movement of the plates toward and away from each other, with spring means to tend to urge the plate members apart. Thus, the gate member is urged into frictional engagement with the annular seating members, and yet when it is removed from the gate, it can be removed in one piece and thereafter taken apart in a manner which tends to reduce losing of the springs between the place when they are removed such as in prior art arrangements.

Still another object of the present invention is to provide a gate valve construction wherein spaced annular seating members are provided in a valve body with a flow passage therethrough, the annular seating members having an annular surface for receiving a gate member between the opposed surfaces of the annular seating members. The annular surface of each member includes a teflon seal ring, and an annular groove that communicates with a sealant conducting passage for supplying sealant to the annular groove.

Yet a further object of the invention is to provide a gate valve construction wherein spaced annular seating members are provided in a valve body with a flow passage therethrough, the annular seating members having an annular surface for receiving a gate member between the opposed surfaces of the annular seating members. The annular surface of each member includes a teflon seal ring, and an annular groove that communicates with a sealant conducting passage for supplying sealant to the annular groove. A cylindrical member is rotatably carried by the upper end of the gate member and is threadedly connected with a stem that is rotatably supported in the body so that upon rotation of the stem the gate can be moved vertically for either blocking the flow through the valve body or for accommodating flow through the valve body. Each of the spaced annular seating members includes projecting spaced vertical guide surfaces for abutting the edges of the gate member to align it as it reciprocates within the valve body.

Other objects and advantages of the invention will become apparent from a consideration of the following drawings and description.

DESCRIPTION OF THE PREFERRED EMBODIMENT

Figure 1:
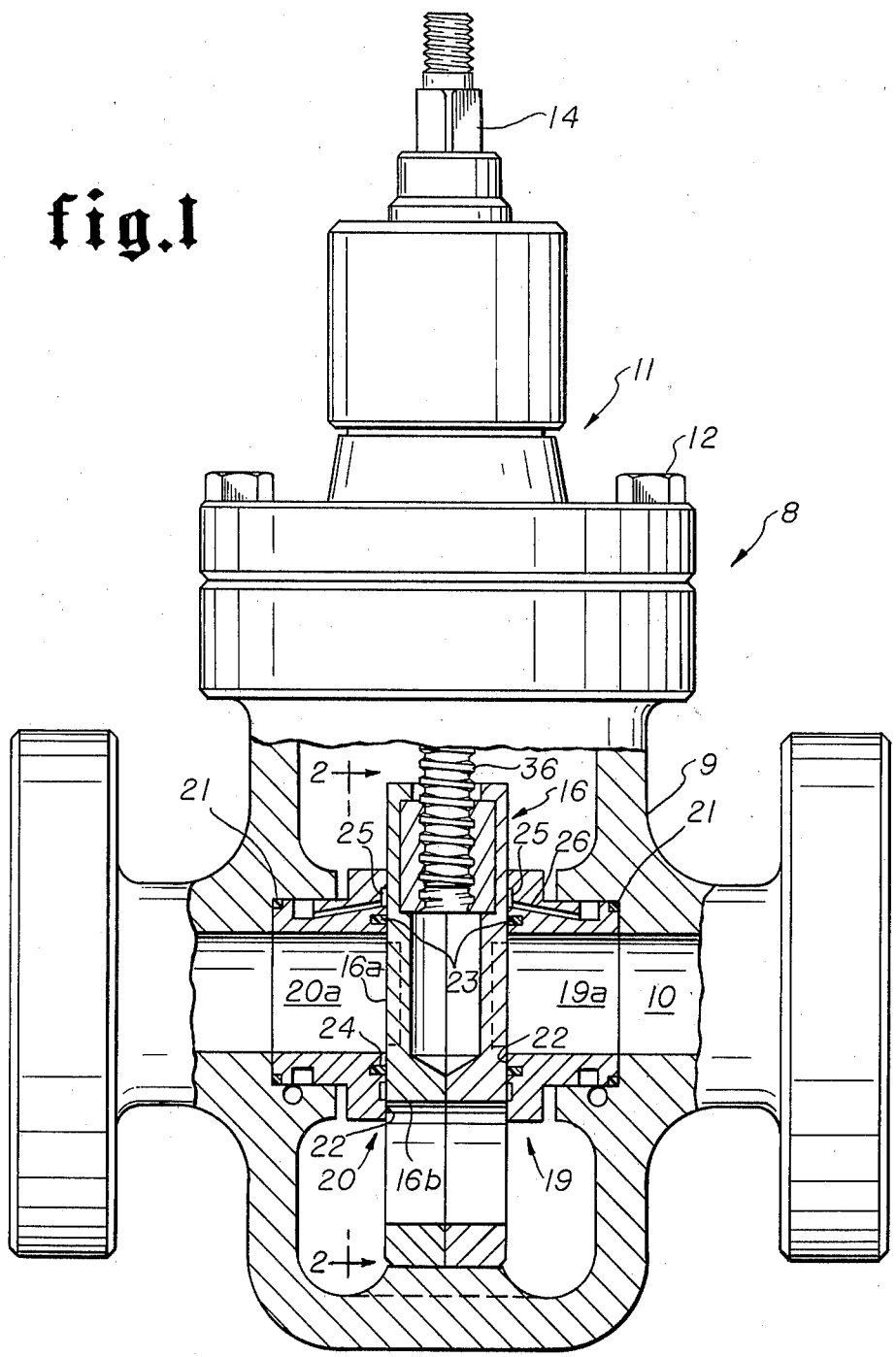
FIG. 1 is a partial sectional view illustrating the gate valve of the present invention with the gate member in closed position between the spaced annular seating members.

Attention is first directed to FIG. 1 of the present invention wherein a gate valve is illustrated generally by the number 8. It is shown as including a body 9 having a flow passage 10 therethrough and a bonnet 11 secured to the valve body 9 by any suitable means such as the bolts 12. A stem 14 is rotatably supported in the bonnet and extends into the valve body to be connected with the gate member referred to generally at 16.

The gate member fits between the spaced annular seating members referred to generally at 19 and 20, which seating members are positioned as illustrated in FIG. 1 of the body. The annular seating members are provided with a bore 19a and 20a respectively which aligns with the bore 10 of the valve body 9 as shown in FIG. 1 of the drawings. Suitable seal means 21 are provided between the valve body 9 and the annular seating members to inhibit leakage fluid from the flow passage 10.

The gate member 16 includes a surface 16a which when in the position illustrated in FIG. 1 of the drawings blocks off flow through the valve body 8, and includes an opening 16b which when aligned with the passage 10 accommodates flow fluid through the valve body 8.

Figure 4:
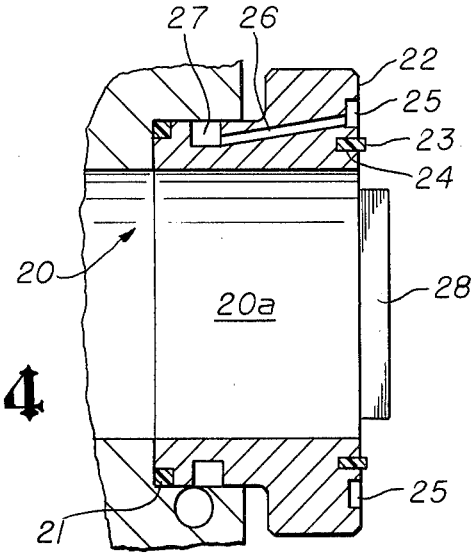
FIG. 4 is a sectional view of one of the spaced annular seating members of the present invention.

The annular seating member 20 is again illustrated in FIG. 4 of the drawings, and each seating member 19 and 20 is identical in construction and includes an annular surface 22 for abutting the gate 16, the surfaces 22 of the seating members 19 and 20 being in opposed spaced relation for receiving the gate member 16 therebetween as shown in FIG. 1 of the drawings. An annular teflon seal means 23 is mounted in the annular groove 24 on the surface 22 of each of the annular seating members 19 and 20 and an annular groove 25 is provided in the surface 22 of each of the annular seating members 19 and 20. The annular groove 25 communicates with the passage means 26 formed in each of the annular seating means which passage means in turn communicates with the annular groove 27 that in turn communicates with a flow passage (not shown) formed in the body 9 for conducting sealant externally of the body 9 into the groove 27, the passage means 26 and the annular groove 25 adjacent the surface of the gate member 16 for providing additional sealing effect between the gate member 16 and the seating members 19 and 20. The teflon annular seal 23 and the annular groove 25 with sealant therein forms a double seal, so that in the event of failure of one seal, the other will remain operative.

Figure 2:
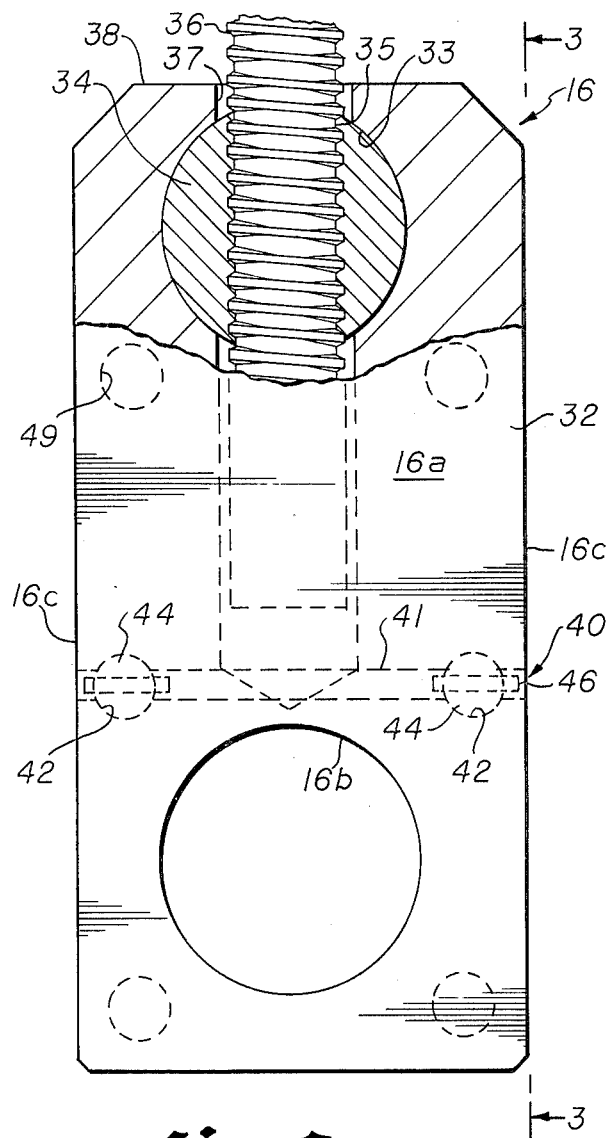
FIG. 2 is an elevational view, partly in section of the gate member of the present invention.
Figure 3:
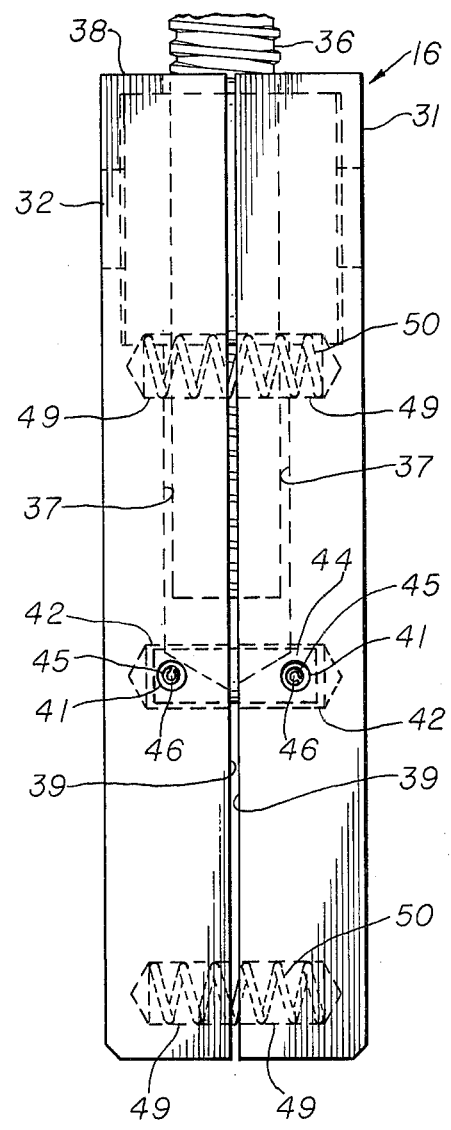
FIG. 3 is an edge view of the gate member of the present invention.

Each of the annular seating members 19 and 20 also includes the vertical spaced projecting guides 28 on each side thereof for abutting each edge 16c, referred to in FIG. 2, of the gate member 16 to aid in retaining it aligned as it travels vertically within the valve body 9.

The gate member 16 includes a pair of rectangular plate members 31 and 32. Each is provided with a cylindrical recess 33 in surface 39 adjacent one end of the plate members 31, 32 for receiving the cylindrical member 34 therein when the plates 31, 32 are secured together. The cylindrical member 34 is provided with a threaded passage 35 for engaging with the threaded portion 36 of the stem 14 as shown in FIGS. 1 and 2 of the drawings. A longitudinally extending recess 37 extends from the upper end 38 of each of the plate members 31 and 32 in surface 39 and terminates in spaced relation to the opening 16b formed in the gate member, such recesses 37 forming a passage when the plates are secured together which is adapted to accommodate movement of the stem 36 into the gate member 16 when the stem 14 is rotated to move the gate upwardly from the position shown in FIG. 1 of the drawings to align the openings 16b therethrough through the passage 10 of the valve body 9.

The plate members 31, 32 are connected together in a manner to accommodate limited relative movement therebetween by the means referred to generally at 40. Such means includes a passage 41 through each of the plate members 31 and 32 with a circular recess 42 extending from the adjacent surfaces 39 of each plate member 31 and 32 as shown in the drawings. The recesses 42 are adapted to each receive the connecting pin or member 44 therein which extends between each of the plate members 31 and 32. Locking pins 46 are formed of plate material rolled into the form of a circle and fitted in the opening 45 adjacent each end of the connecting pins 44 in each of the recesses 41 of the plate members 31 and 32. The ends of the plate material will be spaced apart so that such lock pins 46 can be crimped in the holes 45 to retain them in place. Two connecting pins 44 are shown, one adjacent but spaced from each edge 16c of the plate members 31, 32 as seen in FIG. 2.

When it is desired to separate the plate members 31 and 32, the locking pins 46 may be driven through the openings 45 to fall in passage 41 thus releasing the connecting pins 44 from their engaged position in each of the plates 31 and 32.

Suitable recesses 49 are provided in each of the plate members 31, 32 at desired or suitable spaced intervals for receiving the spring means 50 therein. The spring means 50 tend to urge the plates 31 and 32 apart so that they are always in frictional sliding engagement with the surface 22 of each of the annular seating rings 19 and 20.

The cylindrical member 34 is rotatable in the cylindrical recess 33 and accommodates some misalignment of the gate member 16 relative to the stem 14, since it is rotatably supported in each of the plate members 31 and 32.

The gate valve 8 is operated by rotating stem 14 to move gate 16 down to close the valve 8 as shown in FIG. 1, or to move the gate 16 up to open the valve 8.

When the bonnet 11 is removed for access to the gate 16 for repair or replacement, the gate 16 will remain together even after it is withdrawn from between seating members 19 and 20 by reason of the connecting arrangement 40. After the pins 46 are removed from each end of connecting members 44, the plates 31, 32 separate for access to the springs 50 and cylindrical member 34 for repair or replacement thereof.

The foregoing disclosure and description of the invention are illustrative and explanatory thereof, and various changes in the size, shape, and materials as well as in the details of the illiustrated construction may be made without departing from the spirit of the invention.

What is claimed is:

1. A gate valve comprising:
   a. a body having a flow passage therethrough;
   b. spaced annular seating members in said body;
   c. seal means between said seating members and said body;
   d. a gate member positioned between said seating members and having a surface to close off the flow passage through said body and an opening for alignment with the flow passage through said body, said gate member comprising:
      1. a pair of rectangular plate members;
      2. means connecting said plate members together but accommodating limited relative movement therebetween; and
      3. spring means tending to urge said plate members apart;
   e. said annular seating members each including:
      1. an annular surface for abutting said gate;
      2. annular teflon seal means in each surface for sealing with said gate;
      3. an annular groove on each of said annular surfaces;
      4. sealant passage means communicating with each of said annular grooves; and
      5. projecting spaced vertical guide surfaces for abutting said gate member to retain it aligned in said body;
   f. a stem rotatably supported by said body and having a threaded portion engaged with said gate whereby rotation of said stem raises and lowers said gate;
   g. said body having a sealant flow passage communicating with sealant passage means in said seating members; and
   h. said means connecting said plate members together comprising:
      1. passage means extending through each plate member;
      2. recess means in each plate member and intersecting said passage means;
      3. connector means in said recess means and extending between said plate members;
      4. pin means in said connector means and extending in said passage means of each plate member; and
      5. said pin means being smaller in size than said passage means whereby said plate members may move relative to each other.

* * * * *